(12) United States Patent
Harada

(10) Patent No.: US 8,874,333 B2
(45) Date of Patent: Oct. 28, 2014

(54) CONTROL APPARATUS FOR AUTOMATIC TRANSMISSION

(75) Inventor: Kenichi Harada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 232 days.

(21) Appl. No.: 13/581,796

(22) PCT Filed: Feb. 17, 2011

(86) PCT No.: PCT/JP2011/053395
§ 371 (c)(1),
(2), (4) Date: Aug. 29, 2012

(87) PCT Pub. No.: WO2011/111496
PCT Pub. Date: Sep. 15, 2011

(65) Prior Publication Data
US 2012/0330521 A1      Dec. 27, 2012

(30) Foreign Application Priority Data
Mar. 8, 2010 (JP) .................................. 2010-050649

(51) Int. Cl.
| | |
|---|---|
| *C22B 11/10* | (2006.01) |
| *F16H 61/688* | (2006.01) |
| *F16H 3/00* | (2006.01) |
| *F16H 61/14* | (2006.01) |
| *F16H 59/20* | (2006.01) |
| *F16H 3/093* | (2006.01) |

(52) U.S. Cl.
CPC ........ *F16H 61/143* (2013.01); *F16H 2061/145* (2013.01); *F16H 2200/0056* (2013.01); *F16H 61/688* (2013.01); *F16H 59/20* (2013.01); *F16H 3/006* (2013.01); *F16H 2003/0931* (2013.01)

USPC .............................................. 701/56; 701/55

(58) Field of Classification Search
USPC ....................................................... 701/56, 55
See application file for complete search history.

(56) References Cited

U.S. PATENT DOCUMENTS

| | | | |
|---|---|---|---|
| 5,975,262 A * | 11/1999 | Saito et al. .................... | 192/3.31 |
| 2003/0087561 A1* | 5/2003 | Puettner et al. ............... | 439/745 |
| 2008/0182714 A1 | 7/2008 | Saitou et al. | |
| 2011/0174103 A1* | 7/2011 | Kirchner et al. ................ | 74/325 |

(Continued)

FOREIGN PATENT DOCUMENTS

| | | |
|---|---|---|
| JP | 3-204473 A | 9/1991 |
| JP | 11-294572 A | 10/1999 |

(Continued)

*Primary Examiner* — Stefanos Karmis
*Assistant Examiner* — Michael E Butler
(74) *Attorney, Agent, or Firm* — Squire Patton Boggs (US) LLP

(57) ABSTRACT

In a control apparatus for an automatic transmission having two input shafts connected to an output shaft of a prime mover; two output shafts; and two drive force transmission paths including clutches and synch devices each of which is able to connect a speed gear to the associated one of the output shafts, it is configured to discriminate whether shifting required by an operator is a first shifting pattern or a second shifting pattern, supply fluid pressure to one of the drive force transmission paths associated with a desired speed gear, while engaging the lockup clutch, when the shifting is the first shifting pattern, and supply the fluid pressure to the one of the drive force transmission paths associated with the desired speed gear, while disengaging the lockup clutch, when the shifting is the second shifting pattern.

20 Claims, 7 Drawing Sheets

(56) References Cited

U.S. PATENT DOCUMENTS

2012/0095657 A1* 4/2012 Pudvay ............................ 701/53
2012/0241277 A1* 9/2012 Chambrion et al. .......... 192/48.1
2012/0330521 A1* 12/2012 Harada ............................ 701/56
2013/0261912 A1* 10/2013 Arai ................................ 701/60

FOREIGN PATENT DOCUMENTS

| JP | 2008-180299 A | 8/2008 |
| JP | 2008-309332 A | 12/2008 |
| JP | 2009-180361 A | 8/2009 |

\* cited by examiner

| SPEED | CLUTCH | | SYNCH DEVICE | | | |
|---|---|---|---|---|---|---|
| | CL1 | CL2 | S1 | S3 | S4 | S2 |
| 1 | ○ | | 1 | | | |
| 2 | | ○ | | | 2 | |
| 3 | ○ | | 3 | | | |
| 4 | | ○ | | | | 4 |
| 5 | ○ | | | 5 | | |
| 6 | | ○ | | | 6 | |
| 7 | ○ | | | 7 | | |
| R | | ○ | | | | R |

CONTROL APPARATUS FOR AUTOMATIC TRANSMISSION

CROSS-REFERENCE TO RELATED APPLICATIONS

This application is a National Stage entry of International Application No. PCT/JP2011/053395, filed Feb. 17, 2011, which claims priority to JP Patent Application No. 2010-050649, filed Mar. 8, 2010. The disclosures of the prior applications are incorporated in their entirety by reference.

TECHNICAL FIELD

Embodiments of the invention relate to a control apparatus for an automatic transmission, specifically, a dual clutch type automatic transmission.

BACKGROUND ART

In recent years, an automatic transmission called a dual-clutch (or twin-clutch) type has been proposed. The dual-clutch type automatic transmission is generally equipped with a drive force transmission path constituted of a clutch installed between two input shafts, which are connected to a prime mover output shaft, so as to connect/disconnect either of the input shafts to/from the prime mover output shaft and a gear selecting mechanism that can connect one of a plurality of speed gears, which are installed between the two input shafts and two output shafts, to one of the two output shafts. One example of this is a technique stated in the Patent Reference 1 below.

As stated in the Patent Reference 1, in the dual-clutch type automatic transmission, since a gear corresponding to a desired speed is connected to the relevant output shaft through the gear selecting mechanism and clutch, the gear selecting mechanism of the drive force transmission path associated with the desired speed is operated beforehand prior to the clutch engagement (so-called pre-shift operation is conducted) in order to improve the response of shifting.

PRIOR ART REFERENCE

Patent Reference

Patent Reference 1: Japanese Laid-Open Patent Application 2008-309332

SUMMARY OF INVENTION

Problems to be Solved by the Invention

The technique of the Patent Reference 1 is configured such that the gear selecting mechanism associated with the desired speed is operated beforehand prior to the clutch engagement, thereby improving the response of shifting. However, in the case where the operator requires shifting different from the normally-conducted shifting, for instance, requires kick-down shifting (power-down shifting), the response, particularly the acceleration response becomes sometimes insufficient.

The object of this invention is therefore to overcome this problem by providing an apparatus for controlling a dual-clutch type automatic transmission equipped with a drive force transmission path constituted of output shafts connected to input shafts through clutches and a plurality of speed gears installed to be selectable through gear selecting mechanisms, which apparatus discriminates a shifting pattern required by the operator and based thereon, conducts the shifting control.

Means for Solving the Problems

In order to achieve the object, as recited in a first aspect, this invention is configured to have an apparatus for controlling an automatic transmission that inputs drive force from an output shaft of a prime mover mounted on a vehicle through a liquid coupling having a lockup clutch, and changes the drive force in speed, comprising: at least two input shafts adapted to be connected to the output shaft of the prime mover; an output shaft adapted to be installed in parallel with the input shafts; at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft; a fluid pressure supply mechanism adapted to be able to supply fluid pressure to the lockup clutch, the clutches and the gear selecting mechanisms; a shifting pattern discriminator adapted to discriminate whether shifting required by an operator is a first shifting pattern that includes shifting other than a kick-down shifting or a second shifting pattern that includes the kick-down shifting; and a controller adapted to control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, wherein the controller determines whether required torque required by the operator is greater than a threshold value when it is discriminated to be the second shifting pattern and disengages the lockup clutch when the required torque is determined to be greater than the threshold value, whilst calculating a desired slip amount of the torque converter based on the required torque when the required torque is determined to be not greater than the threshold value and disengaging the lockup clutch such that a slip amount of the torque converter converges to the calculated desired slip amount.

As described below, in the apparatus according to a second aspect, the controller calculates the desired slip amount of the torque converter by retrieving characteristics set for each of the speeds.

As described below, in the apparatus according to a third aspect, the controller calculates the desired slip amount of the torque converter to be a negative value when the vehicle is driven by a wheel.

As described below, as recited in a fourth aspect, this invention is configured to have an apparatus for controlling an automatic transmission that inputs drive force from an output shaft of a prime mover mounted on a vehicle through a liquid coupling having a lockup clutch, and changes the drive force in speed, comprising: at least two input shafts adapted to be connected to the output shaft of the prime mover; an output shaft adapted to be installed in parallel with the input shafts; at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft; a fluid pressure supply mechanism adapted to be able to supply fluid pressure to the lockup clutch, the clutches and the gear selecting mechanisms; a shifting pattern discriminator adapted to discriminate whether shifting required by an operator is a first shifting pattern that includes shifting other than a kick-down shifting or a second shifting pattern that includes the kick-down shifting; and a controller adapted to control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, wherein the controller calculates required torque on the input shaft when it is discriminated to be the second shifting pattern, calculates a desired slip amount of the torque converter based on the calculated required torque and disengages the lockup clutch such that a slip amount of the torque converter converges to the calculated desired slip amount.

As described below, in the apparatus according to a fifth aspect, the controller calculates a required drive force of the vehicle, calculates a required turbine shaft torque based on the calculated required drive force, calculates a desired torque ratio by dividing the calculated required turbine shaft torque by output torque of the prime mover, and calculates the desired slip amount based on the calculated desired torque ratio.

As described below, in the apparatus according to a sixth aspect, the controller calculates required vehicle body acceleration based on a vehicle speed and an accelerator opening and calculates the required drive force of the vehicle based on the calculated required vehicle body acceleration.

Effects of the Invention

In an apparatus for controlling an automatic transmission according to the first aspect, having at least two input shafts adapted to be connected to the output shaft of the prime mover; an output shaft adapted to be installed in parallel with the input shafts; at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft; and a fluid pressure supply mechanism adapted to be able to supply fluid pressure to the lockup clutch, the clutches and the gear selecting mechanisms, it is configured to discriminate whether shifting required by an operator is a first shifting pattern that includes shifting other than a kick-down shifting or a second shifting pattern that includes the kick-down shifting; and control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging (releasing) the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, and further configured to determine whether required torque required by the operator is greater than a threshold value when it is discriminated to be the second shifting pattern and disengage the lockup clutch when the required torque is determined to be greater than the threshold value, whilst calculating a desired slip amount of the torque converter based on the required torque when the required torque is determined to be not greater than the threshold value and disengaging the lockup clutch such that a slip amount of the torque converter converges to the calculated desired slip amount. With this, when the first shifting pattern is defined as the normal shifting, since the gear selecting mechanism associated with the desired speed is operated before the clutch is engaged, the response of the shifting can be enhanced, and since the lockup clutch is engaged and the shifting control is performed, it becomes possible to minimize the energy loss.

Further, when the second shifting pattern is defined as shifting different from the normal shifting, for instance the kick-down shifting (power-down shifting), similarly, since the gear selecting mechanism is operated in advance before the clutch is engaged, the response of the shifting can be enhanced, and since the lockup clutch is disengaged and the shifting control is performed, due to amplification through the liquid coupling like the torque converter, it becomes possible to achieve the acceleration response required by the operator.

In this case, one possible choice is to operate the gear selecting mechanism at the time when the manipulation of the accelerator by the operator is detected. However, when the gear selecting mechanism is operated, even if the clutch is not engaged, the output shaft is rotated accordingly by the presence of operating fluid, it results in friction and the fuel efficiency is deteriorated. In the embodiments, since it is configured to operate the gear selecting mechanism after the shifting pattern is discriminated, the disadvantage like that can be avoided.

Further, since the second shifting pattern is kick-down shifting, it becomes possible to reliably achieve the above effects in the kick-down shifting (or power-down shifting).

Further, it is configured to determine whether required torque required by the operator is greater than a threshold value when it is discriminated to be the second shifting pattern and disengage the lockup clutch when the required torque is determined to be greater than the threshold value. With this, it becomes possible to achieve the acceleration response required by the operator more reliably.

Further, it is configured to calculate a desired slip amount of the torque converter based on the required torque when the required torque is determined to be not greater than the threshold value and disengage the lockup clutch such that a slip amount of the torque converter converges to the calculated desired slip amount. With this, it becomes possible to achieve the acceleration response required by the operator within a range of torque required at the engine more reliably.

In the apparatus according to the second aspect, since it is configured to calculate the desired slip amount of the torque converter by retrieving characteristics set for each of the speeds, it becomes possible to calculate the desired slip amount more appropriately.

In the apparatus according to the third aspect, since it is configured to calculate the desired slip amount of the torque converter to be a negative value when the vehicle is driven by a wheel, it becomes possible to calculate the desired slip amount more appropriately.

It should be noted that, although the slip amount of the torque converter is a difference [rpm] between rotational speed of the prime mover and input rotational speed of the automatic transmission, i.e., Prime mover's rotational speed—Transmission's input rotational speed, since the slip amount is substantially equivalent to a slip ratio, i.e., a ratio [%] obtained through Input rotational speed/Prime mover's rotational speed, the "desired slip amount" in the embodiments is used to mean either of the desired slip amount and desired slip ratio.

In an apparatus for controlling an automatic transmission according to the fourth aspect, having at least two input shafts adapted to be connected to the output shaft of the prime mover; an output shaft adapted to be installed in parallel with the input shafts; at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft; and a fluid pressure supply mechanism adapted to be able to supply fluid pressure to the lockup clutch, the clutches and the gear selecting mechanisms, it is configured to discriminate whether shifting required by an operator is a first shifting pattern that includes shifting other than a kick-down shifting or a second shifting pattern that includes the kick-down shifting; and control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging (releasing) the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, and further configured to calculate required torque on the input shaft when it is discriminated to be the second shifting pattern, calculate a desired slip amount of the torque converter based on the calculated required torque and disengage the lockup clutch such that a slip amount of the torque converter converges to the calculated desired slip amount. With this, in addition to the same effects to be achieved by claim 1, it becomes possible to achieve the acceleration response required by the operator within a range of torque required on the input shaft more reliably.

In the apparatus according to the fifth aspect, it is configured to calculate a required drive force of the vehicle, calculate a required turbine shaft torque based on the calculated required drive force, calculate a desired torque ratio by dividing the calculated required turbine shaft torque by output torque of the prime mover, and calculate the desired slip amount based on the calculated desired torque ratio. With this, it becomes possible to calculate the desired slip amount more accurately.

In the apparatus according to sixth aspect, it is configured to calculate required vehicle body acceleration based on a vehicle speed and an accelerator opening and calculate the required drive force of the vehicle based on the calculated required vehicle body acceleration. With this, it becomes possible to calculate the desired slip amount more accurately.

DESCRIPTION OF EMBODIMENTS

Embodiments for carrying out a control apparatus for an automatic transmission according to the present invention will now be explained with reference to the attached drawings.

First Embodiment

Figure 1:
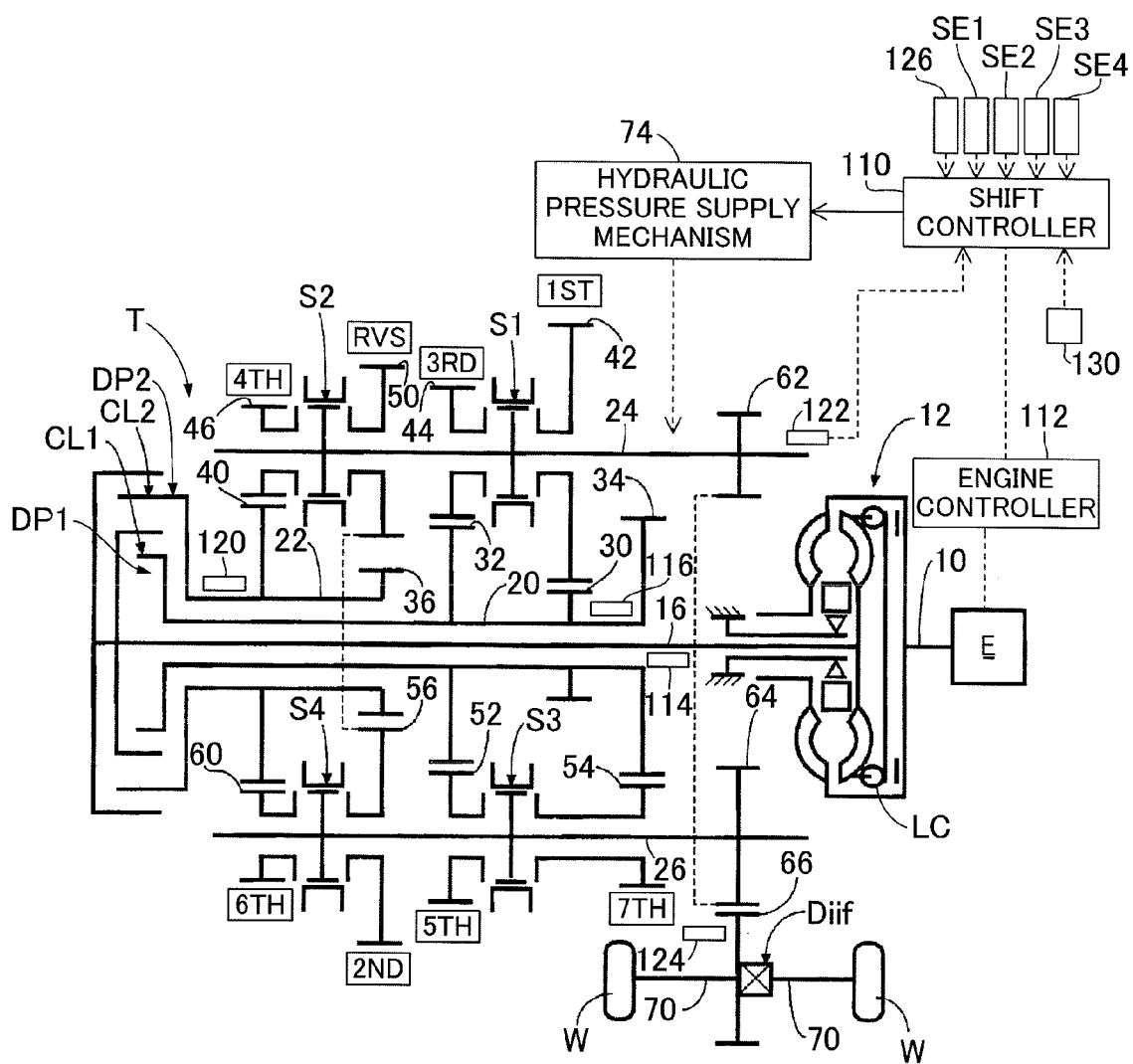
FIG. 1 is an overall schematic view of a control apparatus for an automatic transmission according to a first embodiment of this invention.
Figures 2, 3:
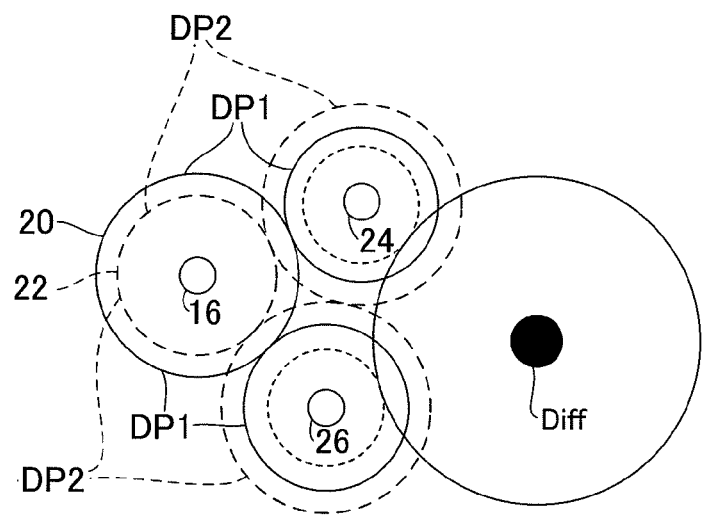
FIG. 2 is an explanatory view showing transmission of drive force from an input shaft shown in FIG. 1.
FIG. 3 is a table showing operation patterns of first and second clutches, etc., shown in FIG. 1.

FIG. 1 is an overall schematic view of a control apparatus for an automatic transmission according to a first embodiment of this invention and FIG. 2 is an explanatory view showing transmission of drive force inputted from an input shaft shown in FIG. 1.

Symbol T indicates the automatic transmission. The transmission T comprises a dual clutch type automatic transmission mounted on a vehicle (not shown) and having gear positions (gear ratios) of seven forward speeds and one reverse speed.

The transmission T includes a main input shaft (main shaft MS) 16 connected through a torque converter (liquid coupling) 12 having a lockup clutch LC to an output shaft 10 that is connected to a crankshaft of an engine (internal combustion engine (prime mover)) E. The main input shaft 16 is installed at its periphery with a first sub-input shaft 20 and second sub-input shaft 22 to be coaxial and rotatable relative to each other.

The main input shaft 16 is connected to the first sub-input shaft 20 through a first clutch CL1 and also the main input shaft 16 is connected to the second sub-input shaft 22 through a second clutch CL2. The first and second clutches CL1, CL2 comprise multi-plate wet clutches.

As illustrated, a first output shaft (countershaft) 24 and second output shaft (countershaft) 26 are disposed in parallel with the main input shaft 16 and first and second sub-input shafts 20, 22.

The first sub-input shaft 20 is fixed with a first-speed drive gear 30, third-fifth-speed drive gear 32 and seventh-speed drive gear 34, while the second sub-input shaft 22 is fixed with a second-speed-RVS (reverse) drive gear 36 and fourth-sixth-speed drive gear 40.

On the other hand, the first output shaft 24 is rotatably disposed with a first-speed driven gear 42 to be meshed with the first-speed drive gear 30, a third-speed driven gear 44 to be meshed with the third-fifth-speed drive gear 32, a fourth-speed driven gear 46 to be meshed with the fourth-sixth-speed drive gear 40, and an RVS driven gear 50.

The first-speed driven gear 42 and third-speed driven gear 44 can be selectively engaged with the first output shaft 24 through a first-third-speed synch (synchronizing) device S1, whilst the fourth-speed driven gear 46 and RVS driven gear 50 can be selectively engaged with the first output shaft 24 through a fourth-speed-RVS synch (synchronizing) device S2.

The second output shaft 26 is rotatably disposed with a fifth-speed driven gear 52 to be meshed with the third-fifth-speed drive gear 32, a seventh-speed driven gear 54 to be meshed with the seventh-speed drive gear 34, a second-speed driven gear 56 to be meshed with the second-speed-RVS drive gear 36 and RVS driven gear 50, and a sixth-speed driven gear 60 to be meshed with the fourth-sixth-speed drive gear 40.

The fifth-speed driven gear 52 and seventh-speed driven gear 54 are selectively connectable with the second output shaft 26 through a fifth-seventh-speed synch (synchronizing) device S3, whilst the second-speed driven gear 56 and sixth-speed driven gear 60 are selectively connectable with the second output shaft 26 through a second-sixth-speed synch (synchronizing) device S4.

A first final drive gear 62 fixed on the first output shaft 24 and a second final drive gear 64 fixed on the second output shaft 26 are meshed with a final driven gear 66 of a differential mechanism Diff. The both sides of the differential mechanism Diff are connected with drive shafts 70 whose ends are attached with wheels W.

As clearly shown in FIG. 2, the first and second sub-input shafts 20, 22 coaxially installed around the main input shaft 16 are connected with the first and second output shafts 24, 26, and the first and second output shafts 24, 26 are connected to the differential mechanism Diff, more exactly, the first and second final drive gears 62, 64 of the output shafts 24, 26 are meshed with the final driven gear 66 of the differential mechanism Diff.

Thus, the automatic transmission T comprises first and second drive force transmission paths DP1, DP2 including the first and second clutches CL1, CL2 installed between the output shaft 10 of the engine E and the first and second sub-input shafts 20, 22, respectively, to connect and disconnect (engage and disengage) the output shaft 10 and the sub-input shafts 20, 22, and the synch devices S1 to S4 that can connect any of speed gears of up to the seventh speed installed between the first and second sub-input shafts 20, 22 and the first and second output shafts 24, 26 to the associated one of the first and second output shafts 24, 26.

The first drive force transmission path DP1 is constituted of the first clutch CL1, odd-numbered speeds and the synch devices S1, S3, while the second drive force transmission path DP2 is constituted of the second clutch CL2, even-numbered speeds and the synch devices S2, S4.

The synch devices S1 to S4 correspond to the aforementioned gear selecting mechanisms. The transmission T is provided with a hydraulic pressure supply mechanism 74 that is able to supply hydraulic pressure (fluid pressure) to the lockup clutch LC, clutches CLn and synch devices Sn. Note that, in the embodiments, when a plurality of members such as the synch devices S1 to S4 are collectively called or when it is not necessary to identify each of such plural members, "n" is used instead of the number like the "synch device(s) Sn."

Each of the synch devices S1 to S4 includes a known sleeve dog clutch spline-coupled to the first or second output shaft 24, 26 to be fixed thereon, and a synch (synchronizing) mechanism (having a coupling sleeve, synchronizer ring, etc.).

The sleeve dog clutch is axially movable and upon being supplied with hydraulic pressure from the hydraulic pressure supply mechanism 74, is moved and engaged with a dog clutch of an adjacent driven gear to connect the driven gear to the output shaft 24 or 26.

In the above configuration, when the first clutch CL1 is engaged, drive force outputted from the output shaft 10 of the engine E is transmitted to the first sub-input shaft 20 through the torque converter 12, main input shaft 16 and first clutch CL1, and when the second clutch CL2 is engaged, drive force of the engine E is transmitted to the second sub-input shaft 22 through the torque converter 12, main input shaft 16 and second clutch CL2.

Specifically, when hydraulic pressure is supplied to the first-third-speed synch device S1 to displace it rightward in FIG. 1, it connects the first-speed driven gear 42 to the first output shaft 24. Under the connected condition, when hydraulic pressure is supplied to the first clutch CL1 to engage it, the first speed is established.

Similarly, under the condition where the second-speed driven gear 56 is connected with the second output shaft 26 by displacing the second-sixth-speed synch device S4 rightward in the figure, when the second clutch CL2 is engaged, the second speed is established.

Under the condition where the third-speed driven gear 44 is connected with the first output shaft 24 by displacing the first-third-speed synch device S1 leftward, when the first clutch CL1 is engaged, the third speed is established.

Under the condition where the fourth-speed driven gear 46 is connected with the first output shaft 24 by displacing the fourth-speed-RVS synch device S2 leftward, when the second clutch CL2 is engaged, the fourth speed is established.

Under the condition where the fifth-speed driven gear 52 is connected with the second output shaft 26 by displacing the fifth-seventh-speed synch device S3 leftward, when the first clutch CL1 is engaged, the fifth speed is established.

Under the condition where the sixth-speed driven gear 60 is connected with the second output shaft 26 by displacing the second-sixth-speed synch device S4 leftward, when the second clutch CL2 is engaged, the sixth speed is established.

Under the condition where the seventh-speed driven gear 54 is connected with the second output shaft 26 by displacing the fifth-seventh-speed synch device S3 rightward, when the first clutch CL1 is engaged, the seventh speed is established.

Under the condition where the RVS driven gear 50 is connected with the first output shaft 24 by displacing the fourth-speed-RVS synch device S2 rightward, when the second clutch CL2 is engaged, the RVS position is established.

Operation patterns of the first and second clutches CL1, CL2, etc., are shown in FIG. 3. In the drawing, the circle indicates that the clutch is engaged.

As mentioned in the foregoing, in the case where the gear position (speed) is shifted up among the first to seventh speeds, while hydraulic pressure is supplied to the first clutch CL1 of the first drive force transmission path DP1 and the first speed is established, hydraulic pressure is supplied to the second-sixth-speed synch device S4 of the second drive force transmission path DP2, which is associated with the second speed, to displace the synch device S4 rightward so that the second-speed driven gear 56 is connected to the second output shaft 26.

Then, hydraulic pressure is discharged from the first clutch CL1 to disconnect (release) it from the output shaft 10 and hydraulic pressure is supplied to the second clutch CL2 to connect (engage) it to the output shaft 10, so that the second speed is established.

While hydraulic pressure is supplied to the second clutch CL2 of the second drive force transmission path DP2 and the second speed is established, hydraulic pressure is supplied to the first-third-speed synch device S1 of the first drive force transmission path DP1, which is associated with the third speed to be established next, to displace the synch device S1 leftward so as to connect the third-speed driven gear 44 to the first output shaft 24.

Then, hydraulic pressure is discharged from the second clutch CL2 to disconnect (release) it from the output shaft 10 and hydraulic pressure is supplied to the first clutch CL1 to connect (engage) it to the output shaft 10, so that the third speed is established. Subsequently, this operation is repeated to shift up the gear position.

In contrast, in the case where the gear position (speed) is shifted down among the seventh to first speeds, while hydraulic pressure is supplied to the first clutch CL1 of the first drive force transmission path DP1 and the seventh speed is established, hydraulic pressure is supplied to the second-sixth-speed synch device S4 of the second drive force transmission path DP2, which is associated with the sixth speed, to displace the synch device S4 leftward so as to connect the sixth-speed driven gear 60 to the second output shaft 26.

Then, hydraulic pressure is discharged from the first clutch CL1 to disconnect (release) it from the output shaft 10 and hydraulic pressure is supplied to the second clutch CL2 to connect (engage) it to the output shaft 10, so that the sixth speed is established.

While hydraulic pressure is supplied to the second clutch CL2 of the second drive force transmission path DP2 and the sixth speed is established, hydraulic pressure is supplied to the fifth-seventh-speed synch device S3 of the first drive force transmission path DP1, which is associated with the fifth speed to be established next, to displace the synch device S3 leftward so as to connect the fifth-speed driven gear 52 to the first output shaft 24.

Then, hydraulic pressure is discharged from the second clutch CL2 to disconnect (release) it from the output shaft 10 and hydraulic pressure is supplied to the first clutch CL1 to connect (engage) it to the output shaft 10, so that the fifth speed is established. Subsequently, this operation is repeated to shift down the gear position.

The foregoing operation makes possible to shift up/down the gear position with continuous or seamless drive force, i.e., with good response. Note that the aforesaid operation to supply hydraulic pressure to the synch device Sn associated with the relevant driven gear of the next speed (desired speed) to connect the driven gear to the first output shaft 24 (or second output shaft 26), is hereinafter called "pre-shift."

Next, hydraulic pressure supply to the synch device Sn, etc., through the hydraulic pressure supply mechanism 74 will be explained with reference to FIG. 4.

As illustrated, the synch devices 51 to S4 are respectively provided with a first-third-speed hydraulic pressure actuator A1, fourth-speed-RVS hydraulic pressure actuator A2, fifth-seventh-speed hydraulic pressure actuator A3 and second-sixth-speed hydraulic pressure actuator A4.

The first-third-speed hydraulic pressure actuator A1 is equipped with a first-speed piston PS1 and third-speed piston PS3 facing each other, the fourth-speed-RVS hydraulic pressure actuator A2 with a four-speed piston PS4 and RVS piston PSR facing each other, the fifth-seventh-speed hydraulic pressure actuator A3 with a fifth-speed piston PS5 and seventh-speed piston PS7 facing each other, and the second-sixth-speed hydraulic pressure actuator A4 with a second-speed piston PS2 and sixth-speed piston PS6 facing each other.

In the hydraulic pressure actuators An, the piston PS1 and other pistons are integrally disposed with shift folks SF1 to SF4 and connected to the sleeve dog clutches of the corresponding synch devices Sn through the shift folks SFn.

In the hydraulic pressure supply unit 74, operating oil ATF that is pumped up (drawn) from a reservoir 76 through a strainer 80 by an oil pump 82, is adjusted to a level of line pressure by a regulator valve 86 that is controlled through a linear solenoid valve 84. An accumulator 90 is connected for compensating the increase in the line pressure.

The line pressure regulated by linear solenoid valves LS1, LS2 is supplied to the first to fourth hydraulic pressure actuators An through third-A shift valve VA3A, third-B shift valve VA3B, fourth shift valve VA4, fifth shift valve VA5 and sixth shift valve VA6 so as to displace the sleeve dog clutches of the corresponding synch devices Sn from the neutral position to the right or left engaging position (rightward or leftward).

Detents (not shown) are provided at the shift folks at positions corresponding to the neutral position and right and left engaging positions. When the synch device Sn is at the neutral position, the position is retained with the detent, thereby making hydraulic pressure supply unnecessary.

An oil passage for clutch control starting from a first shift valve VA1 is connected to the first clutch CL1 via a manual valve 92, while another oil passage for clutch control starting from a second shift valve VA2 is connected to the second clutch CL2 also via the manual valve 92.

The manual valve 92 is connected to a shift lever (not shown) provided near the floor of the operator's seat (not shown) of the vehicle and a spool thereof is displaced to a position corresponding to a range selected by the operator from among ranges of P, R, N, D and L.

To be more specific, when the D, L or R range is selected, hydraulic pressure is supplied to the first or second clutch CL1, CL2 and it connects the output shaft 10 of the engine E to the first or second sub-input shaft 20, 22 in FIG. 1 to transmit drive force of the engine E to the first or second drive force transmission path DP1, DP2.

On the other hand, when the P or R range is selected, no hydraulic pressure is supplied to either of the first and second clutches CL1, CL2 and the connection of the output shaft 10 of the engine E with the first or second sub-input shafts 20, 22 is cut off, so that drive force of the engine E is not transmitted to either of the first and second drive force transmission paths DP1, DP2.

The explanation will be made on the lockup clutch LC. The line pressure is supplied to a back pressure chamber LCa (or back pressure chamber LCa and inner pressure chamber LCb) of the lockup clutch LC of the torque converter 12 via an LC shift valve 94 operated through an LC solenoid valve SHLC and via an LC control valve 100 controlled through a linear solenoid valve 96.

When the linear solenoid valve 96 and LC solenoid valve SHLC are both energized (magnetized), hydraulic pressure flows from the LC shift valve 94, through oil passages 102, 104, to the back pressure chamber LCa and inner pressure chamber LCb of the lockup clutch LC, thereby engaging the lockup clutch LC.

When the linear solenoid valve 96 and LC solenoid valve SHLC are both deenergized (demagnetized), hydraulic pressure flows from the LC shift valve 94, through the oil passage 102, to the back pressure chamber LCa of the lockup clutch LC, thereby releasing or disengaging the lockup clutch LC.

The degree of engagement of the lockup clutch LC, i.e., the degree between engagement and disengagement, in other words, a slip amount of the torque converter 12 depends on the level of hydraulic pressure to be supplied to the back pressure chamber LCa, which level is regulated by duty-ratio-controlling energization of the linear solenoid valve 96.

Figure 4:
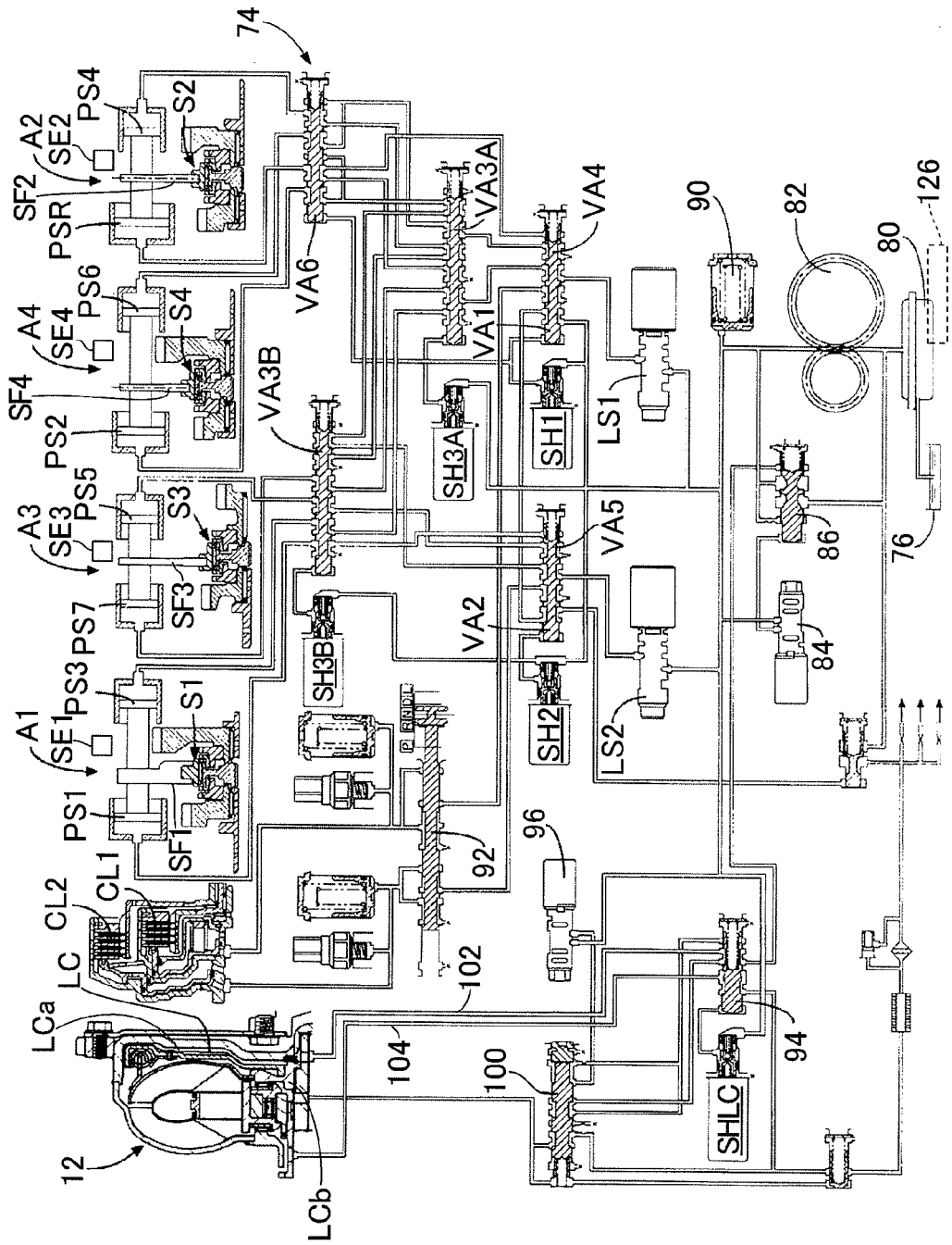
FIG. 4 is a hydraulic pressure circuit diagram showing details of a hydraulic pressure supply mechanism shown in FIG. 1.

Thus, in the hydraulic pressure supply mechanism 74 shown in FIG. 4, the engagement/disengagement of the lockup clutch LC, the operation (connection/disconnection) of the first and second clutches CL1, CL2 and the operation of the synch devices Sn are controlled by energizing and deenergizing the linear solenoid valve 96, the LC solenoid valve SHLC, the linear solenoid valves LS1, LS2 and shift solenoid valves SH1, SH2, SH3A and SH4A provided to correspond to the shift valves VAn.

The explanation on FIG. 1 will be resumed. The transmission T has a shift controller 110. The shift controller 110 is constituted as an Electronic Control Unit (ECU) having a microcomputer.

The engine E comprises, for example, a spark-ignition, gasoline internal combustion engine. An engine controller 112 also constituted as an ECU having a microcomputer is provided to control the operation of the engine E.

In the engine E, its throttle valve has no mechanical connection with an accelerator pedal and a DBW (Drive-By-Wire) mechanism is provided. Based on an accelerator opening (AP opening) and engine speed NE, the engine controller 112 calculates a required torque PMCMD required at the engine E and based on the calculated required torque PMCMD and the engine speed NE, controls the fuel injection amount and ignition timing. It should be noted that, in the embodiments, the calculation of the required torque PMCMD is not limited to the above example.

The shift controller 110 is able to communicate with the engine controller 112 to acquire information including the engine speed NE, AP opening, required torque PMCMD, etc., therefrom.

A first rotational speed sensor 114 is installed near the main input shaft 16 to produce an output or signal indicative of an input rotational speed NM of the transmission T, while second, third and fourth rotational speed sensors 116, 120, 122 are installed at the first and second sub-input shafts 20, 22 and the first output shaft 24, respectively, and each produces an output or signal indicative of a rotational speed of the associated shaft.

A fifth rotational speed sensor 124 is installed near the final driven gear 66 to produce an output or signal indicative of a rotational speed of the final driven gear 66, i.e., a vehicle speed V.

A temperature sensor 126 is installed in the reservoir 76 of the hydraulic pressure supply mechanism 74 to produce an output or signal indicative of a temperature of the operating oil ATF, i.e., oil temperature TATF. Stroke sensors (displacement sensors) SE1 to SE4 are installed at the actuators A1 to A4, i.e., each of the stroke sensors SEn is installed near a pair of the pistons facing each other and produces an output or signal indicative of stroke (displacement) of the pistons.

A manual shift SW (switch) 130 is provided near the shift lever and produces a shifting signal indicative of shift-up or shift-down upon the manipulation by the operator.

Those sensor outputs are also inputted to the shift controller 110. Based on the inputted sensor outputs and information acquired from the engine controller 112, the shift controller 110 performs control explained below to energize and deenergize the aforementioned linear solenoid valve 96, etc., to control the operation of the hydraulic pressure supply mechanism 74.

Figure 5:
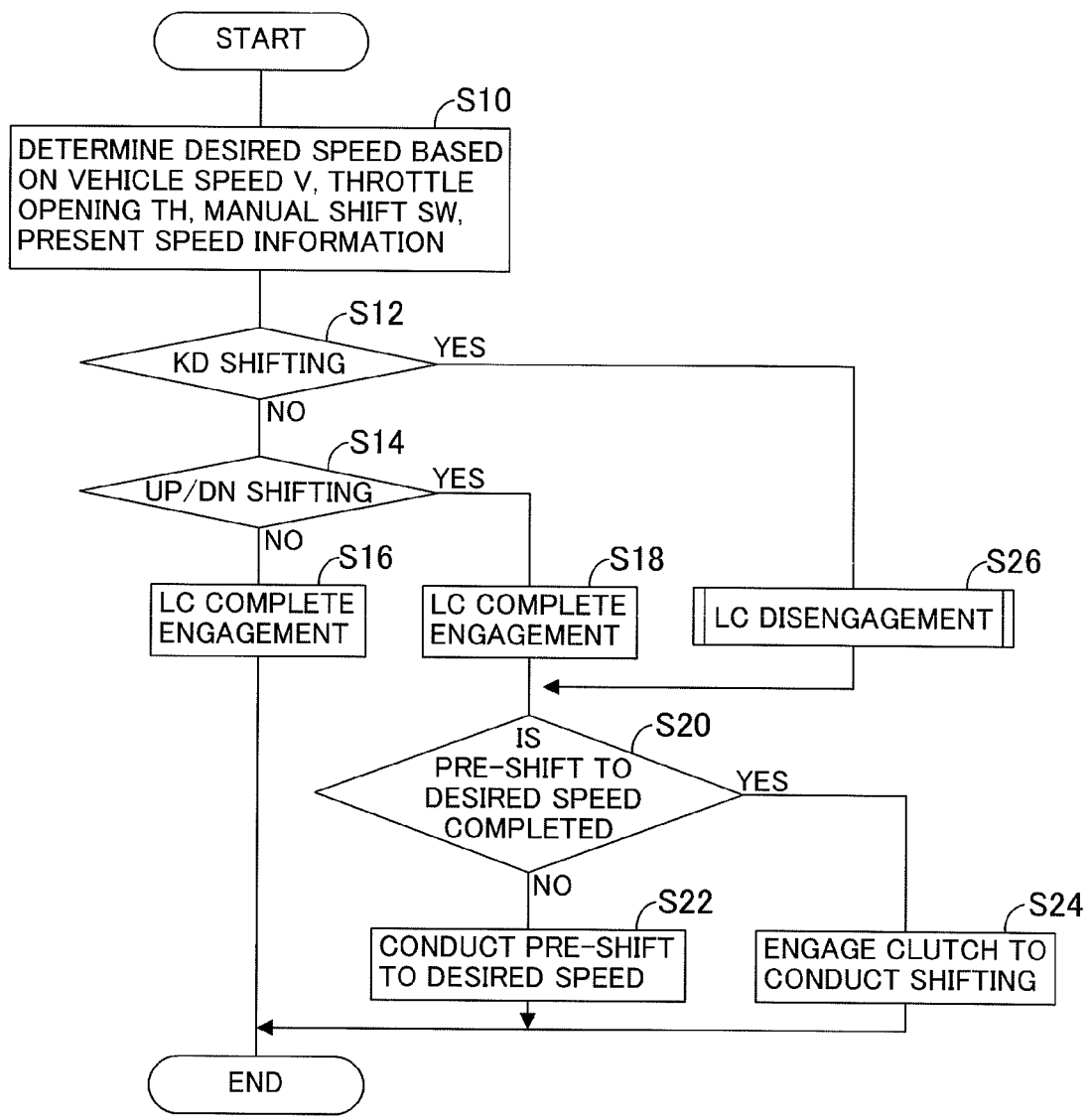
FIG. 5 is a flowchart showing the operation of the apparatus according to the first embodiment.

FIG. 5 is a flowchart showing the operation of the shift controller 110, i.e., the operation of the apparatus according to the first embodiment.

The program begins at S10 in which a shift-scheduling map is retrieved using the vehicle speed V and throttle opening TH and in addition thereto, based on the AP opening, the output of the manual shift SW (switch) 130 and information on the present speed (gear position), a desired speed (gear position) is determined. The present speed is determined based on the operation of the synch devices Sn, etc.

The program proceeds to S12 in which it is determined whether it is KD shifting, i.e., whether the shifting required by the operator is kick-down shifting (power-down shifting).

This determination is made by checking as to whether the AP opening is equal to or greater than a predetermined value when the present speed is greater than the desired speed. In the case where a KDSW (switch) is equipped, an output of the KDSW can be used to determine it.

When the result in S12 is negative, the program proceeds to S14 in which it is determined whether it is UP/DN shifting, i.e., whether it is not the KD shifting but the usual shifting of shift-up or down.

When the result in S14 is negative, the program proceeds to S16 in which LC complete engagement is carried out, i.e., in the hydraulic pressure supply mechanism 74, the linear solenoid valve 96 and LC solenoid valve SHLC are both energized so that the lockup clutch LC is completely engaged, and the remaining steps are skipped.

When the result in S14 is affirmative, the program proceeds to S18 in which, similarly, the lockup clutch LC is completely engaged, and to S20 in which, based on the output of the stroke sensor SEn at the relevant synch device Sn, it is determined whether the pre-shift to the desired speed has been completed, i.e., whether the synch device Sn was moved to connect the driven gear to the output shaft and the driven gear has been completely meshed with the corresponding drive gear (i.e., whether it is in-gear).

When the result in S20 is negative, the program proceeds to S22 in which the pre-shift to the desired speed is conducted (continued).

Specifically, while hydraulic pressure is supplied to one of the clutches CLn of the first and second drive force transmission paths DP1, DP2, which one is associated with the gear of the present speed, so that the present speed is established, hydraulic pressure is supplied to the synch device Sn of the other of the clutches CLn of the drive force transmission paths DP1, DP2, which other is associated with the desired speed, by energizing and deenergizing the relevant shift solenoid, so that the synch device Sn is operated and accordingly, the driven gear of the desired speed is connected to the corresponding one of the first and second output shafts 24, 26.

When the result in S20 is affirmative, the program proceeds to S24 in which the relevant clutch CLn is engaged so that the shifting to the desired speed is conducted.

When the result in S12 is affirmative, the program proceeds to S26 in which the lockup clutch LC is disengaged.

Figure 6:
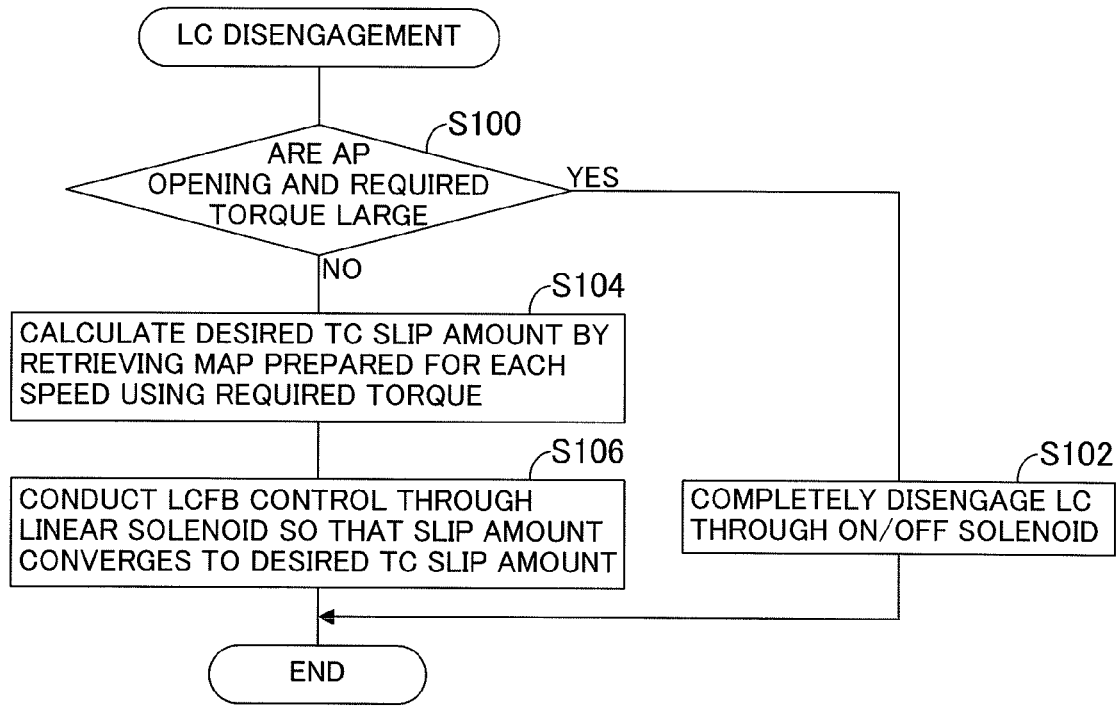
FIG. 6 is a subroutine flowchart showing a lock-up clutch disengaging process of the FIG. 5 flowchart.

FIG. 6 is a subroutine flowchart showing the lock-up clutch disengaging process.

In S100, it is determined whether the AP opening and required torque PMCMD are large, i.e., whether each of them is greater than its threshold value. This process is made to determine whether the required torque required by the operator is greater than the threshold value. Also in the case where the KDSW is provided and operated, the same process is conducted.

When the result in S100 is affirmative, the program proceeds to S102 in which the linear solenoid valve 96 and LC solenoid valve SHLC of the hydraulic pressure supply mechanism 74 are both deenergized to completely disengage the lockup clutch LC.

Figure 7:
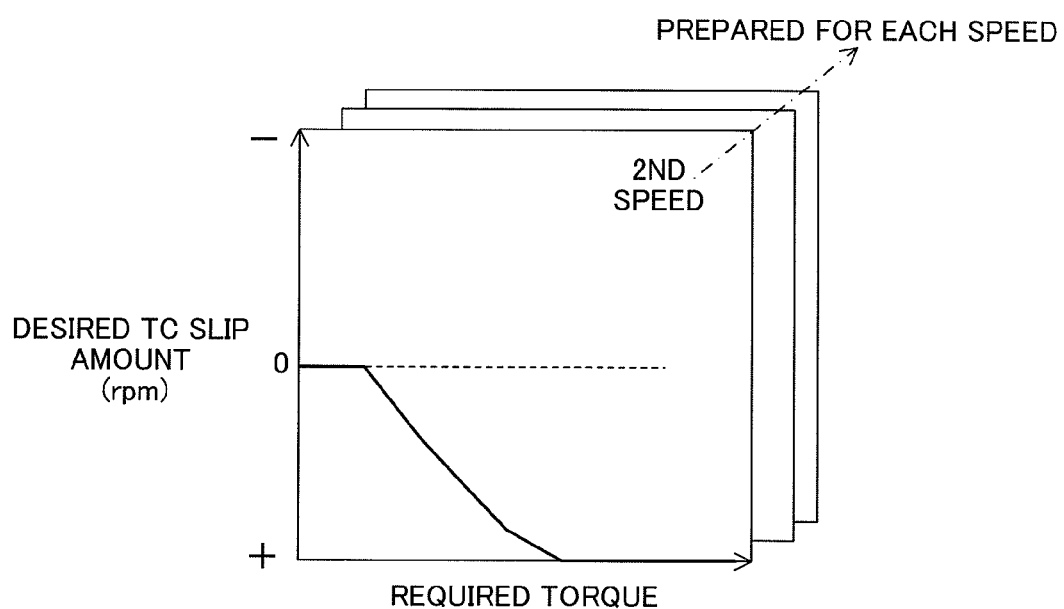
FIG. 7 is an explanatory view showing the characteristics of maps used for calculating a desired slip amount of a torque converter in the FIG. 6 flowchart.

When the result in S100 is negative, the program proceeds to S104 in which a desired TC slip amount, i.e., a desired slip amount of the torque converter 12 is calculated. The desired TC slip amount is calculated by retrieving a map whose characteristics are shown in FIG. 7 using the required torque PMCMD.

The desired TC slip amount is defined by the equation: Engine speed NE−Input rotational speed NM [rpm]. As illustrated, the map is prepared for each speed (i.e., each desired speed). When the vehicle is driven from the wheel side, the desired TC slip amount exceeds 0 to the negative value side.

As mentioned in the foregoing, since the slip amount of the torque converter 12 is substantially equivalent to a slip ratio, i.e., a ratio [%] obtained through the equation: Input rotational speed NM/Engine speed NE, a "desired slip ratio" can be used instead of the "desired slip amount."

Next the program proceeds to S106 in which the energization of the linear solenoid valve 96 is duty-ratio-controlled to regulate the level of hydraulic pressure to be supplied to the back pressure chamber LCa so that the slip amount of the torque converter 12 converges the calculated desired TC slip amount.

Returning to the explanation on the FIG. 5 flowchart, the processes of S20 onward are again explained. The program proceeds to S20 in which it is determined whether the pre-shift to the desired speed has been completed. When the result in S20 is negative, the program proceeds to S22 in which the pre-shift to the desired speed is conducted, while when the result is affirmative, the program proceeds to S24 in which the relevant clutch CLn is engaged so that the shifting to the desired speed is conducted.

In this embodiment, when the result in S12 is negative and the program goes via S14 to S24, the shifting with this process is called a "first shifting pattern." In the first shifting pattern, since the clutch CLn is engaged after the pre-shift is completed, the response of the shifting can be enhanced. Further, since the lockup clutch LC is completely engaged, it becomes possible to minimize the energy loss caused by the slip of the torque converter 12.

When the result in S12 is affirmative and the program goes to S26 and then via S20 to S24, the shifting with this process is called a "second shifting pattern." In the second shifting pattern, similarly, since the clutch CLn is engaged after the pre-shift is completed, the response of the shifting can be enhanced. Further, since the lockup clutch LC is disengaged, due to amplification through the torque converter (liquid coupling) 12, it becomes possible to achieve the acceleration response required by the operator.

Second Embodiment

Figure 8:
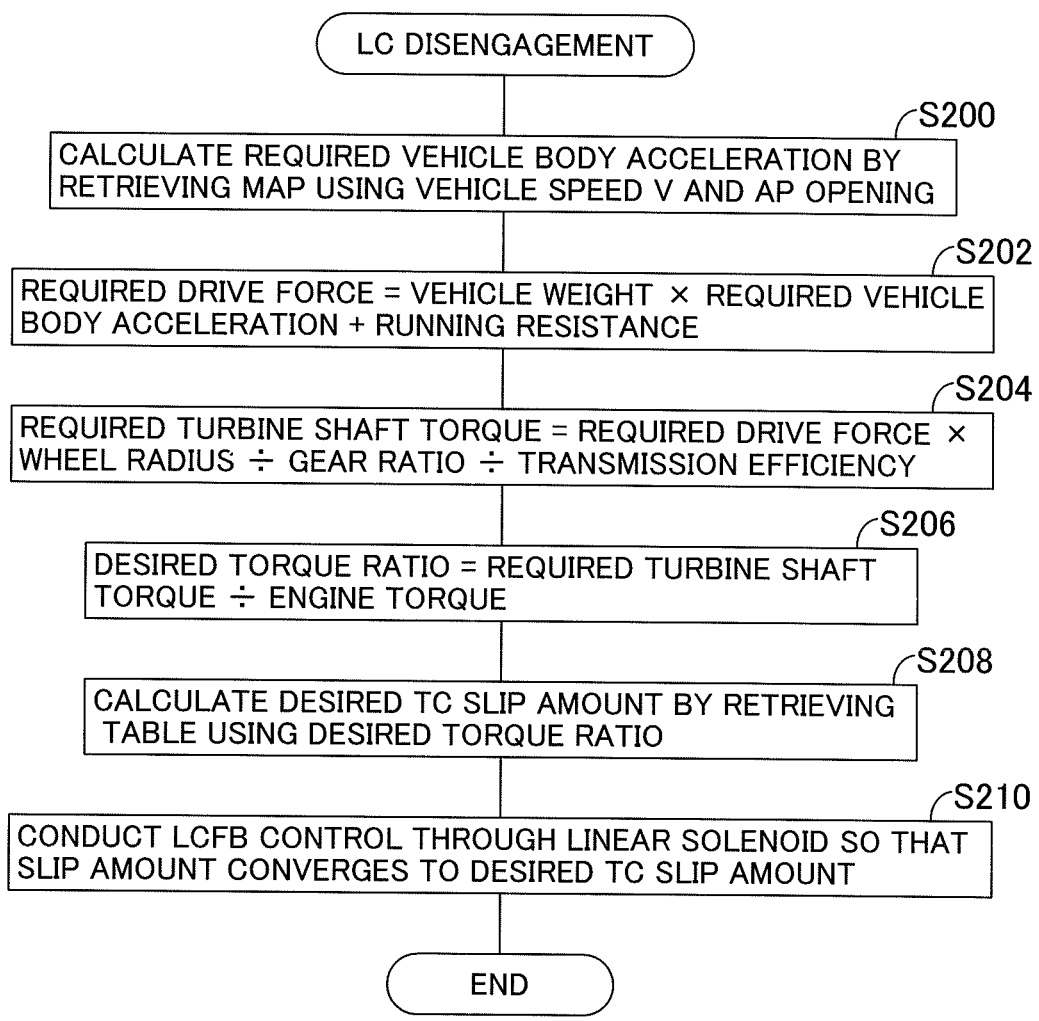
FIG. 8 is a subroutine flowchart similarly to FIG. 6, but showing a lock-up clutch disengaging process executed by a control apparatus for an automatic transmission according to a second embodiment of this invention.

FIG. 8 is a subroutine flowchart similarly to FIG. 6, but showing a lock-up clutch disengaging process at the KD shifting, executed by a control apparatus for an automatic transmission according to a second embodiment of this invention.

Figure 9:
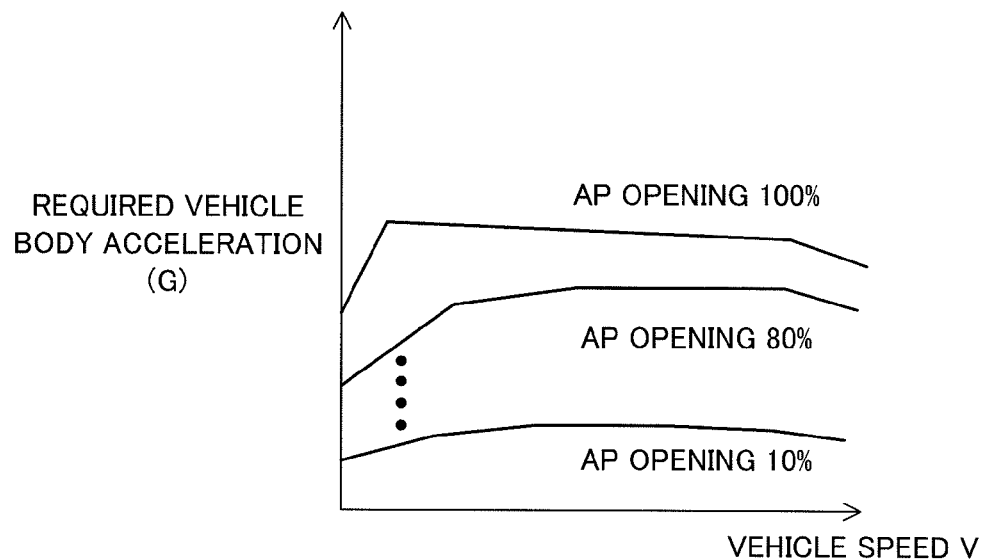
FIG. 9 is an explanatory view showing the characteristics of a map used for calculating required vehicle body acceleration in the FIG. 8 flowchart.

The program begins at S200 in which required vehicle body acceleration is calculated by retrieving a map whose characteristics are shown in FIG. 9 using the vehicle speed V and AP opening. The required vehicle body acceleration is indicated by a value between 0 and 1.0 G (G: gravitational acceleration) and is set for each given value of the accelerator opening (AP opening).

Next the program proceeds to S202 in which the vehicle weight (fixed value) is multiplied by the calculated required vehicle body acceleration and the product is added to appropriately-calculated running resistance to calculate required drive force.

Next the program proceeds to S204 in which a product obtained by multiplying the calculated required drive force by a wheel radius (fixed value) is divided by the gear ratio (calculated from the speed, etc.) and by efficiency of the transmission T (calculated from the required torque PMCMD and speed) to calculate required turbine shaft torque, i.e., required torque on the main input shaft 16.

Next the program proceeds to S206 in which a desired torque ratio is calculated by dividing the calculated required turbine shaft torque by engine torque (calculated from the engine speed NE and intake manifold absolute pressure PBA).

Figure 10:
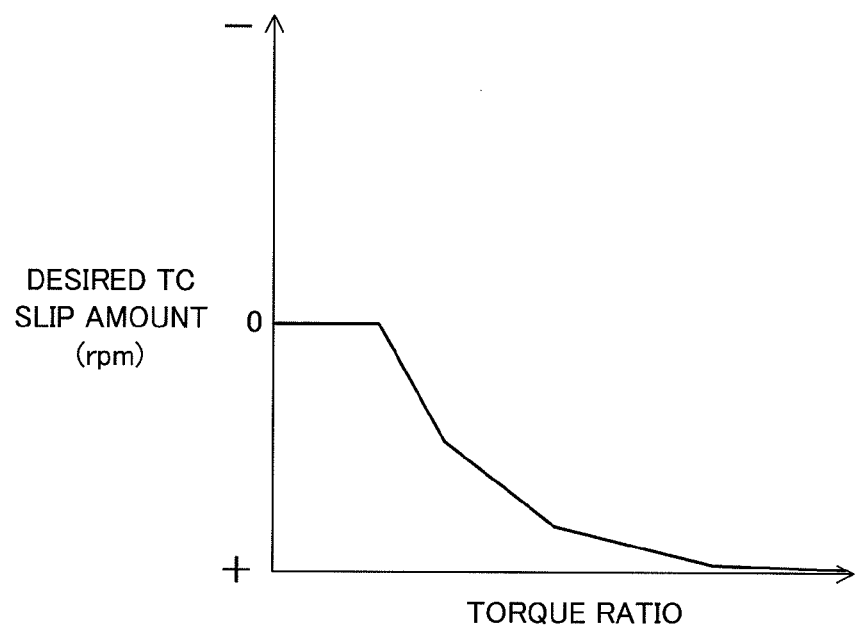
FIG. 10 is an explanatory view showing the characteristics of a table used for calculating a desired slip amount of a torque converter in the FIG. 8 flowchart.

Next the program proceeds to S208 in which a desired TC slip amount is calculated by retrieving a table whose characteristics are shown in FIG. 10 using the calculated desired torque ratio, and to S210 in which the energization of the linear solenoid valve 96 is duty-ratio-controlled to regulate the level of hydraulic pressure to be supplied to the back pressure chamber LCa so that the slip amount of the torque converter 12 converges the calculated desired TC slip amount.

In the second embodiment, similarly to the first embodiment, since the clutch CLn is engaged after the pre-shift is completed, the response of the shifting can be enhanced, and since the slip amount of the torque converter 12 is calculated more accurately, it becomes possible to achieve both the suppression of energy loss and the amplification through the partial release of the torque converter 12 more appropriately.

As stated above, in the first embodiment, it is configured to have an apparatus (shift controller 110) and method for controlling an automatic transmission (T) that inputs drive force from an output shaft (10) of a prime mover (engine E) mounted on a vehicle through a liquid coupling (torque converter 12) having a lockup clutch (LC), and changes the drive force in speed, characterized by: at least two input shafts (first and second sub-input shafts 20, 22) adapted to be connected to the output shaft of the prime mover; an output shaft (first and second output shafts 24, 26) adapted to be installed in parallel with the input shafts; at least two drive force transmission paths (first and second drive force transmission paths DP1, DP2) having clutches (CLn) adapted to be respectively installed between the output shaft of the prime mover and the two input shafts to connect and disconnect the output shaft of the prime mover and the input shafts, and gear selecting mechanisms (synch devices Sn) each adapted to be able to connect one of a plurality of speed gears (30, 32, . . . ) disposed between the two input shafts and the output shaft to the output shaft; a fluid pressure supply mechanism (74) adapted to be able to supply fluid pressure to the lockup clutch, the clutches and the gear selecting mechanisms; a shifting pattern discriminator (S10, S12) adapted to discriminate whether shifting required by an operator is a first shifting pattern that includes shifting other than a kick-down shifting or a second shifting pattern that includes the kick-down shifting; and a controller adapted to control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern (S14, S18 to S24), whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern (S12, S26, S20 to S24), wherein the controller determines whether required torque required by the operator is greater than a threshold value (S26, S100) when it is discriminated to be the second shifting pattern (S10, S12) and disengages the lockup clutch when the required torque is determined to be greater than the threshold value (S102), whilst calculating a desired slip amount of the torque converter (12) based on the required torque (S104) when the required torque is determined to be not greater than the threshold value (S100) and disengaging the lockup clutch such that a slip amount of the torque converter converges to the calculated desired slip amount (S106). With this, when the first shifting pattern is defined as the normal shifting, since the gear selecting mechanism Sn associated with the desired speed is operated before the clutch CLn is engaged, the response of the shifting can be enhanced, and since the lockup clutch LC is engaged and the shifting control is performed, it becomes possible to minimize the energy loss.

Further, when the second shifting pattern is defined as shifting different from the normal shifting, for instance the kick-down shifting (power-down shifting), similarly, since the gear selecting mechanism Sn is operated in advance before the clutch CLn is engaged, the response of the shifting can be enhanced, and since the lockup clutch LC is disengaged and the shifting control is performed, due to amplification through the liquid coupling like the torque converter 12, it becomes possible to achieve the acceleration response required by the operator.

In this case, one possible choice is to operate the gear selecting mechanism Sn at the time when the manipulation of the accelerator by the operator is detected. However, when the gear selecting mechanism Sn is operated, even if the clutch CLn is not engaged, the output shaft 24, 26 is rotated accordingly by the presence of operating fluid, it results in friction and the fuel efficiency is deteriorated. In the embodiments, since it is configured to operate the gear selecting mechanism Sn after the shifting pattern is discriminated, the disadvantage like that can be avoided.

Further, since the second shifting pattern is kick-down (KD) shifting, it becomes possible to reliably achieve the above effects in the kick-down shifting (or power-down shifting).

Further, the controller determines whether required torque required by the operator is greater than a threshold value when it is discriminated to be the second shifting pattern and disengages the lockup clutch when the required torque is determined to be greater than the threshold value. With this, it becomes possible to achieve the acceleration response required by the operator more reliably.

Further, the controller calculates a desired slip amount of the torque converter based on the required torque when the required torque is determined to be not greater than the threshold value and disengages the lockup clutch such that a slip amount of the torque converter converges to the calculated desired slip amount. With this, it becomes possible to achieve the acceleration response required by the operator within a range of torque required at the engine E more reliably.

In the apparatus and method, since the controller calculates the desired slip amount of the torque converter by retrieving characteristics set for each of the speeds (S26, S100, S102), it becomes possible to calculate the desired slip amount more appropriately.

In the apparatus and method, since the controller calculates the desired slip amount of the torque converter to be a negative value when the vehicle is driven by a wheel (S26, S100, S102), it becomes possible to calculate the desired slip amount more appropriately.

In the second embodiment, it is configured to have an apparatus (shift controller 110) and method for controlling an automatic transmission (T) that inputs drive force from an output shaft (10) of a prime mover (engine E) mounted on a vehicle through a liquid coupling (torque converter 12) having a lockup clutch (LC), and changes the drive force in speed, characterized by: at least two input shafts (first and second sub-input shafts 20, 22) adapted to be connected to the output shaft of the prime mover; an output shaft (first and second output shafts 24, 26) adapted to be installed in parallel with the input shafts; at least two drive force transmission paths (first and second drive force transmission paths DP1, DP2) having clutches (CLn) adapted to be respectively installed between the output shaft of the prime mover and the two input shafts to connect and disconnect the output shaft of the prime mover and the input shafts, and gear selecting mechanisms (synch devices Sn) each adapted to be able to connect one of a plurality of speed gears (30, 32, ...) disposed between the two input shafts and the output shaft to the output shaft; a fluid pressure supply mechanism (74) adapted to be able to supply fluid pressure to the lockup clutch, the clutches and the gear selecting mechanisms; a shifting pattern discriminator (S10, S12) adapted to discriminate whether shifting required by an operator is a first shifting pattern that includes shifting other than a kick-down shifting or a second shifting pattern that includes the kick-down shifting; and a controller adapted to control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern (S14, S18 to S24), whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern (S12, S26, S20 to S24), wherein the controller calculates required torque on the input shaft (S200 to S204) when it is discriminated to be the second shifting pattern (S10, S12), calculates a desired slip amount of the torque converter based on the calculated required torque (S206 to S208) and disengages the lockup clutch such that a slip amount of the torque converter converges to the calculated desired slip amount (S210). With this, in addition to the same effects to be achieved by claim 1, it becomes possible to achieve the acceleration response required by the operator within a range of torque required on the input shaft more reliably.

In the apparatus and method, the controller calculates a required drive force of the vehicle, calculates a required turbine shaft torque based on the calculated required drive force, calculates a desired torque ratio by dividing the calculated required turbine shaft torque by output torque of the prime mover, and calculates the desired slip amount based on the calculated desired torque ratio (S26, S202, S208). With this, it becomes possible to calculate the desired slip amount more accurately.

In the apparatus and method, the controller calculates required vehicle body acceleration based on a vehicle speed (V) and an accelerator opening (AP) and calculates the required drive force of the vehicle based on the calculated required vehicle body acceleration (S200). With this, it becomes possible to calculate the desired slip amount more accurately.

It should be noted that the dual-clutch type automatic transmission is not limited to the aforesaid example and various alternatives thereof can be employed. In that sense, the expression of "at least two input shafts" or the like is used. In other words, this invention can be applied to the case where three or more members are equipped.

It should also be noted that, although the engine (internal combustion engine) is exemplified as the prime mover, it may be a motor (electric motor), hybrid of a motor (electric motor) and engine or any device that generates drive force.

It should also be noted that the liquid coupling is not limited to the torque converter which is exemplified in the above embodiments. Also, although the operating oil is exemplified as operating fluid, it is not limited thereto.

Industrial Applicability

According to this invention, in a control apparatus for an automatic transmission having two input shafts connected to an output shaft of an engine; an output shaft installed in parallel with the input shafts; and two drive force transmission paths including clutches and synch devices each of which is able to connect a speed gear to the associated one of the output shafts, it is configured to discriminate whether shifting required by an operator is a first shifting pattern or a second shifting pattern, supply fluid pressure to one of the drive force transmission paths associated with a desired speed gear, while engaging the lockup clutch, when the shifting is the first shifting pattern, and supply the fluid pressure to the one of the drive force transmission paths associated with the desired speed gear, while disengaging the lockup clutch, when the shifting is the second shifting pattern. With this, when the first shifting pattern is defined as the normal shifting, it becomes possible to enhance the response of the shifting and minimize the energy loss. Further, since the second shifting pattern is defined as kick-down shifting, etc., it becomes possible to enhance the response of the shifting similarly and achieve the acceleration response required by the operator.

DESCRIPTION OF SYMBOLS

T Automatic transmission (Transmission), E Engine (Internal combustion engine (Prime mover)), CLn Clutch, Sn Synchronizing (synch) device (Gear selecting mechanism), An Hydraulic pressure actuator, VAn Shift valve, SHn Shift solenoid valve, LC Lockup clutch, LCa Back pressure chamber, LCb Inner pressure chamber, SEn Stroke sensor, 10 Output shaft, 12 Torque converter (Liquid coupling), 16 Main input shaft, 20, 22 Sub-input shaft (Input shaft), 24, 26 Output shaft, 30, 32, 34, 36, 40, 42, 44, 46, 50, 52, 54, 56, 60 Speed gear, 74 Hydraulic pressure supply mechanism, LS1, LS2, 84, 96 Linear solenoid valve, 86 Regulator valve, 92 Manual valve, 94 LC shift valve, 100 LC control valve, 102, 104 Oil passage, 110 Shift controller, 112 Engine controller.

The invention claimed is:

1. An apparatus for controlling an automatic transmission that inputs drive force from an output shaft of a prime mover mounted on a vehicle through a liquid coupling having a lockup clutch, and changes the drive force in speed, comprising:
at least two input shafts adapted to be connected to the output shaft of the prime mover;
an output shaft adapted to be installed in parallel with the input shafts;
at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft;
a fluid pressure supply mechanism adapted to be able to supply fluid pressure to the lockup clutch, the clutches and the gear selecting mechanisms;
a shifting pattern discriminator adapted to discriminate whether shifting required by an operator is a first shifting pattern that includes shifting other than a kick-down shifting or a second shifting pattern that includes the kick-down shifting; and
controlling means for controlling a controller adapted to control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern,
wherein the controller determines whether required torque required by the operator is greater than a threshold value when it is discriminated to be the second shifting pattern and disengages the lockup clutch when the required torque is determined to be greater than the threshold value, whilst calculating a desired slip amount of the torque converter based on the required torque when the required torque is determined to be not greater than the threshold value and disengaging the lockup clutch such that a slip amount of the torque converter converges to the calculated desired slip amount.

2. The apparatus according to claim 1, wherein the controller calculates the desired slip amount of the torque converter by retrieving characteristics set for each of the speeds.

3. The apparatus according to claim 2, wherein the controller calculates the desired slip amount of the torque converter to be a negative value when the vehicle is driven by a wheel.

4. An apparatus for controlling an automatic transmission that inputs drive force from an output shaft of a prime mover mounted on a vehicle through a liquid coupling having a lockup clutch, and changes the drive force in speed, comprising:
at least two input shafts adapted to be connected to the output shaft of the prime mover;
an output shaft adapted to be installed in parallel with the input shafts;
at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft;
a fluid pressure supply mechanism adapted to be able to supply fluid pressure to the lockup clutch, the clutches and the gear selecting mechanisms;
a shifting pattern discriminator adapted to discriminate whether shifting required by an operator is a first shifting pattern that includes shifting other than a kick-down shifting or a second shifting pattern that includes the kick-down shifting; and a controller adapted to control operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, wherein the controller calculates required torque on the input shaft when it is discriminated to be the second shifting pattern, calculates a desired slip amount of the torque converter based on the calculated required torque and disengages the lockup clutch such that a slip amount of the torque converter converges to the calculated desired slip amount.

5. The apparatus according to claim 4, wherein the controller calculates a required drive force of the vehicle, calculates a required turbine shaft torque based on the calculated required drive force, calculates a desired torque ratio by dividing the calculated required turbine shaft torque by output torque of the prime mover, and calculates the desired slip amount based on the calculated desired torque ratio.

6. The apparatus according to claim 5, wherein the controller calculates required vehicle body acceleration based on a vehicle speed and an accelerator opening and calculates the required drive force of the vehicle based on the calculated required vehicle body acceleration.

7. An apparatus for controlling an automatic transmission that inputs drive force from an output shaft of a prime mover mounted on a vehicle through a liquid coupling having a lockup clutch, and changes the drive force in speed, comprising:

at least two input shafts adapted to be connected to the output shaft of the prime mover;

an output shaft adapted to be installed in parallel with the input shafts;

at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft;

a fluid pressure supply mechanism adapted to be able to supply fluid pressure to the lockup clutch, the clutches and the gear selecting mechanisms;

shifting pattern discriminating means for discriminating whether shifting required by an operator is a first shifting pattern that includes shifting other than a kick-down shifting or a second shifting pattern that includes the kick-down shifting; and controlling means for controlling operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, wherein the controlling means determines whether required torque required by the operator is greater than a threshold value when it is discriminated to be the second shifting pattern and disengages the lockup clutch when the required torque is determined to be greater than the threshold value, whilst calculating a desired slip amount of the torque converter based on the required torque when the required torque is determined to be not greater than the threshold value and disengaging the lockup clutch such that a slip amount of the torque converter converges to the calculated desired slip amount.

8. The apparatus according to claim 7, wherein the controlling means calculates the desired slip amount of the torque converter by retrieving characteristics set for each of the speeds.

9. The apparatus according to claim 7, wherein the controlling means calculates the desired slip amount of the torque converter to be a negative value when the vehicle is driven by a wheel.

10. The apparatus according to claim 8, wherein the controlling means calculates the desired slip amount of the torque converter to be a negative value when the vehicle is driven by a wheel.

11. An apparatus for controlling an automatic transmission that inputs drive force from an output shaft of a prime mover mounted on a vehicle through a liquid coupling having a lockup clutch, and changes the drive force in speed, comprising:
- at least two input shafts adapted to be connected to the output shaft of the prime mover;
- an output shaft adapted to be installed in parallel with the input shafts;
- at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft;
- a fluid pressure supply mechanism adapted to be able to supply fluid pressure to the lockup clutch, the clutches and the gear selecting mechanisms;
- shifting pattern discriminating means for discriminating whether shifting required by an operator is a first shifting pattern that includes shifting other than a kick-down shifting or a second shifting pattern that includes the kick-down shifting; and
- controlling means for controlling operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern,
- wherein the controlling means calculates required torque on the input shaft when it is discriminated to be the second shifting pattern, calculates a desired slip amount of the torque converter based on the calculated required torque and disengages the lockup clutch such that a slip amount of the torque converter converges to the calculated desired slip amount.

12. The apparatus according to claim 11, wherein the controlling means calculates a required drive force of the vehicle, calculates a required turbine shaft torque based on the calculated required drive force, calculates a desired torque ratio by dividing the calculated required turbine shaft torque by output torque of the prime mover, and calculates the desired slip amount based on the calculated desired torque ratio.

13. The apparatus according to claim 12, wherein the controlling means calculates required vehicle body acceleration based on a vehicle speed and an accelerator opening and calculates the required drive force of the vehicle based on the calculated required vehicle body acceleration.

14. A method for controlling an automatic transmission that inputs drive force from an output shaft of a prime mover mounted on a vehicle through a liquid coupling having a lockup clutch, and changes the drive force in speed, the automatic transmission further having at least two input shafts adapted to be connected to the output shaft of the prime mover; an output shaft adapted to be installed in parallel with the input shafts; at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft; and a fluid pressure supply mechanism adapted to be able to supply fluid pressure to the lockup clutch, the clutches and the gear selecting mechanisms, comprising the steps of:
- discriminating whether shifting required by an operator is a first shifting pattern that includes shifting other than a kick-down shifting or a second shifting pattern that includes the kick-down shifting; and
- controlling operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern,
- wherein the step of controlling determines whether required torque required by the operator is greater than a threshold value when it is discriminated to be the second shifting pattern and disengages the lockup clutch when the required torque is determined to be greater than the threshold value, whilst calculating a desired slip amount of the torque converter based on the required torque when the required torque is determined to be not greater than the threshold value and disengaging the lockup clutch such that a slip amount of the torque converter converges to the calculated desired slip amount.

15. The method according to claim 14, wherein the step of controlling calculates the desired slip amount of the torque converter by retrieving characteristics set for each of the speeds.

16. The apparatus according to claim 14, wherein the step of controlling calculates the desired slip amount of the torque converter to be a negative value when the vehicle is driven by a wheel.

17. The apparatus according to claim 15, wherein the step of controlling calculates the desired slip amount of the torque converter to be a negative value when the vehicle is driven by a wheel.

18. A method for controlling an automatic transmission that inputs drive force from an output shaft of a prime mover mounted on a vehicle through a liquid coupling having a lockup clutch, and changes the drive force in speed, the automatic transmission further having at least two input shafts adapted to be connected to the output shaft of the prime mover; an output shaft adapted to be installed in parallel with the input shafts; at least two drive force transmission paths having clutches adapted to be respectively installed between the output shaft of the prime mover and the two input shafts to connect and disconnect the output shaft of the prime mover and the input shafts, and gear selecting mechanisms each adapted to be able to connect one of a plurality of speed gears adapted to define speeds and be disposed between the two input shafts and the output shaft to the output shaft; and a fluid pressure supply mechanism adapted to be able to supply fluid pressure to the lockup clutch, the clutches and the gear selecting mechanisms, comprising the steps of:

discriminating whether shifting required by an operator is a first shifting pattern that includes shifting other than a kick-down shifting or a second shifting pattern that includes the kick-down shifting; and controlling operation of the fluid pressure supply mechanism by, while engaging the lockup clutch and supplying the fluid pressure to the clutch of one of the drive force transmission paths associated with a present speed gear so that a present speed is established, supplying the fluid pressure to the gear selecting mechanism of other of the drive force transmission paths associated with a desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the first shifting pattern, whereas, while disengaging the lockup clutch and supplying the fluid pressure to the clutch of the one of the drive force transmission paths associated with the present speed gear so that the present speed is established, supplying the fluid pressure to the gear selecting mechanism of the other of the drive force transmission paths associated with the desired next speed gear so as to connect the input shaft of the other of the drive force transmission paths to the output shaft via the next speed gear, then after the input shaft and the output shaft are connected, discharging the fluid pressure from the clutch of the one of the drive force transmission paths and supplying the fluid pressure to the clutch of the other of the drive force transmission paths, when it is discriminated that the shifting is the second shifting pattern, wherein the step of controlling calculates required torque on the input shaft when it is discriminated to be the second shifting pattern, calculates a desired slip amount of the torque converter based on the calculated required torque and disengages the lockup clutch such that a slip amount of the torque converter converges to the calculated desired slip amount.

19. The method according to claim 18, wherein the step of controlling calculates a required drive force of the vehicle, calculates a required turbine shaft torque based on the calculated required drive force, calculates a desired torque ratio by dividing the calculated required turbine shaft torque by output torque of the prime mover, and calculates the desired slip amount based on the calculated desired torque ratio.

20. The method according to claim 19, wherein the step of controlling calculates required vehicle body acceleration based on a vehicle speed and an accelerator opening and calculates the required drive force of the vehicle based on the calculated required vehicle body acceleration.

* * * * *